ދ3,069,274
PROTECTOR AND RIPENER FOR FRUIT
Nathan K. Concannon, 10 Leahaven Road,
Boston 26, Mass.
No Drawing. Filed Oct. 14, 1959, Ser. No. 846,266
8 Claims. (Cl. 99—171)

This invention is a cushioned protector for bananas and other fruit, comprising essentially a sheet of foam, polyethylene foam being preferred, about an inch or so thick, which provides a cushion or wrapper which by virtue of its thickness and resiliency furnishes a cushioned protector for the fruit, and so would prevent bruising of the fruit. The cushioned protector of this invention is particularly adapted as a wrapper for bunches of bananas. It can also be used as a liner for shipping containers, cartons, freight cars and the like in which bananas and other fruits are shipped.

An important feature of the invention is that the polyethylene foam is impregnated with a technical salt of polyethylene halides of ethylene and, particularly ethylene dichloride, which is available in granular form. The amount of ethylene dichloride is of the order of two ounces per square yard, where the foam is about an inch thick. This amount can be varied from about 1 to 4 ounces per square yard, as desired.

The sheet of polyethylene foam impregnated with the ethylene dichloride will slowly give off ethylene gas. Ethylene is well known as a preserver and ripener for fruit, particularly bananas, and so the fruit, encased in the treated polyethylene foam, is subjected to ethylene gas, which ripens and mellows the fruit and also protects the fruit from bruising, due to the cushioning effect of the foam.

The fruit, protected by the treated polyethylene foam wrapper, is thus ripened in transit and so the customary treatment of the fruit in storage sheds with ethylene gas is shortened or dispensed with entirely. It may be possible with this invention to unload the bananas from the ships directly into trucks or freight cars, without putting the bananas in a warehouse for treatment with ethylene gas.

While polyethylene foam is preferred, others could be used, such as polyurethane foam, poly (vinyl chloride) foam, foam rubber, etc.

While ethylene dichloride is preferred, other halides of ethylene for example, ethylene bromide or ethylene iodide could also be used.

Another important feature of the invention is that the foam protector or wrapper is impregnated with an insecticide. The preferred insecticide is pyrethrum, although others could be used. The foam wrapper is impregnated with the pyrethrum, the preferred amount being about one-quarter ounce of pyrethrum per square yard, where the foam is about one inch thick. This amount can be varied from about one-eighth to about one-half ounce per square yard, for different thicknesses of the foam.

Another important advantage of the synthetic foam of the present invention is that the blanket or layer of foam is an excellent insulator and so protects the fruit against cold and freezing, as well as against excessive heat. The foam also protects the fruit against excessive moisture.

The foam wrappers of this invention can be used over and over again, the effectiveness of the added materials, namely, the ethylene dichloride and the insecticide lasting for several months.

To summarize the four most important advantages of this invention:

(1) The fruit is protected against bruising by the thick layer or cushion of polyethylene foam.

(2) The fruit is ripened and mellowed while in transit by ethyelne gas given off by the ethylene dichloride in the foam.

(3) Insects are minimized or destroyed by the insecticide.

(4) The blanket, liner and protector of polyethylene foam is an insulator against cold and heat, so protects the fruit against excessive cold and possible freezing of the fruit, as well as against excessive heat, which might cause too rapid ripening of the fruit. It also protects the fruit against excessive moisture.

I claim as my invention:

1. A shock absorbing, cushioned protector for fruit, comprising a relatively thick blanket of polyethylene foam impregnated with ethylene dichloride for giving off ethylene for mellowing and ripening the fruit.

2. A shock absorbing, cushioned wrapper for fruit, comprising a relatively thick blanket of foam selected from the group consisting of polyethylene foam, polyurethane foams, vinyl chloride foams, and foam rubber, impregnated with a halide of ethylene in the amount of about 1 to 4 ounces of said compound per square yard of said foam for producing ethylene gas for mellowing and ripening the fruit while in transit in said wrapper.

3. A shock absorbing, cushioned protector for fruit, comprising a relatively thick blanket of foam selected from the group consisting of polyethylene foam, polyurethane foams, vinyl chloride foams, and foam rubber, impregnated with ethylene dichloride in the amount of about 1 to 4 ounces of said compound per square yard of said foam.

4. A shock absorbing cushioned protector for fruit, comprising a relatively thick blanket of polyethylene foam impregnated with ethylene dichloride in the amount of about 1 to 4 ounces of said compound per square yard of said foam.

5. A shock absorbing, cushioned protector for fruit, comprising a relatively thick blanket of polyethylene foam impregnated with ethylene dichloride and approximately one-fourth ounce of an insecticide per square yard of foam.

6. A shock absorbing, cushioned protector for fruit, comprising a relatively thick blanket of foam selected from the group consisting of polyethylene foam, polyurethan foams, vinyl chloride foams, and foam rubber, impregnated with ethylene dichloride a compound for producing ethylene for ripening and mellowing the fruit and further impregnated with approximately one fourth ounce of an insecticide per square yard of foam.

7. A shock absorbing, cushioned wrapper for fruit comprising a relatively thick blanket of polyethylene foam impregnated with ethylene dichloride in an amount of about 1 to 4 ounces per square yard of foam for producing ethylene gas for mellowing and ripening the fruit while in transit in said wrapper, and further impregnated with approximately one-fourth ounce of pyrethrum as an insecticide per square yard of foam.

8. A shock absorbing, cushioned protector for fruit, consisting essentially of a synthetic foam selected from the group consisting of polyethylene foam, polyurethane foams, vinyl chloride foams, and foam rubber, impregnated with ethylene dichloride in an amount of about 1 to 4 ounces per square yard of foam which slowly gives off ethylene such protector also serving to insulate the fruit against heat and cold and to protect the fruit against excessive moisture.

References Cited in the file of this patent

UNITED STATES PATENTS

| | | |
|---|---|---|
| 2,180,744 | Maxey | Nov. 21, 1939 |
| 2,256,483 | Johnston | Sep. 23, 1941 |
| 2,425,238 | Fletcher et al | Aug. 5, 1947 |
| 2,858,225 | Gooding et al | Oct. 28, 1958 |
| 2,883,322 | Whipple | Apr. 21, 1959 |

OTHER REFERENCES

"Baker's Helper," August 5, 1950, page 57, article entitled New Insecticide May Prevent Insect Fragments in Flour.